(12) United States Patent
Beech et al.

(10) Patent No.: US 6,957,044 B2
(45) Date of Patent: Oct. 18, 2005

(54) SATELLITE COMMUNICATION APPARATUS

(75) Inventors: Brian Herbert Beech, Basingstoke (GB); David G. Edwards, Eastleigh (GB); Ravin Perinpanayagam, Eastleigh (GB)

(73) Assignee: Tandberg Television ASA, Lysaker (NO)

( * ) Notice: Subject to any disclaimer, the term of this patent is extended or adjusted under 35 U.S.C. 154(b) by 578 days.

(21) Appl. No.: 10/097,495

(22) Filed: Mar. 13, 2002

(65) Prior Publication Data

US 2002/0164949 A1 Nov. 7, 2002

(30) Foreign Application Priority Data

Mar. 13, 2001 (GB) .................................... 0106159

(51) Int. Cl.⁷ ............................................. H04B 7/185
(52) U.S. Cl. .................. 455/13.4; 455/114.3; 455/501; 455/127.1; 375/298; 375/340
(58) Field of Search .......................... 455/13.4, 501, 455/114.3, 12.1, 127.1, 127.2, 127.3, 127.4; 375/265, 341, 298, 340; 714/794, 792, 796

(56) References Cited

U.S. PATENT DOCUMENTS

| | | | |
|---|---|---|---|
| 5,148,448 A | | 9/1992 | Karam et al. |
| 6,269,125 B1 * | | 7/2001 | Seccia et al. .............. 375/265 |
| 6,335,766 B1 * | | 1/2002 | Twitchell et al. ........... 348/608 |
| 6,400,415 B1 * | | 6/2002 | Danielsons ................ 348/608 |
| 6,449,466 B1 * | | 9/2002 | Jin et al. .................. 455/127.2 |
| 6,600,516 B1 * | | 7/2003 | Danielsons et al. ........ 348/608 |
| 6,684,064 B2 * | | 1/2004 | Kazakevich et al. ....... 455/126 |
| 2002/0008777 A1 * | | 1/2002 | Ovadia et al. .............. 348/470 |
| 2002/0085117 A1 * | | 7/2002 | Harris et al. ............... 348/473 |

FOREIGN PATENT DOCUMENTS

| | | |
|---|---|---|
| EP | 0869650 A | 10/1998 |
| WO | 95 32561 | 11/1995 |
| WO | 00 25495 | 5/2000 |
| WO | WO00/25495 | 5/2000 |
| WO | 01 08297 | 2/2001 |

OTHER PUBLICATIONS

Eggers G et al: "2 GHZ Bandwidth Predistortion Linearizer for Microwave Power Amplifiers at Ku-Band" 24th. European Microwave Conference Proceedings, Cannes, Sep. 5-8, 1994.

European Microwave Conference Proceedings, Nexus Business Communications, GB, vol. 2 Conf. 24, Sep. 5, 1994, pp. 1501-1505, XP000678255 ISBN: 0-9518-0325-5 Abstract.

* cited by examiner

Primary Examiner—Nay Maung
Assistant Examiner—Shaima Q. Aminzay
(74) Attorney, Agent, or Firm—Timothey J. Keefer; Seyfarth Shaw LLP

(57) ABSTRACT

A satellite communication apparatus has a corrector for reducing distortion of a signal in a communication channel. The corrector is formed by a forward model representative of a pre-calculated estimate of non-linearity and group delay of the satellite transmission/reception channel from the input to the up sampler through to the output of the down sampler. The forward model may also comprise a model of magnitude response of a satellite input multiplexer filter and output multiplexer filter. Cascaded identical stages of the corrector may be provided so that distortion in the channel is successively reduced towards zero by each successive stage. An initial approximator which is substantially the inverse of the distorting function of the forward model may be provided.

23 Claims, 3 Drawing Sheets

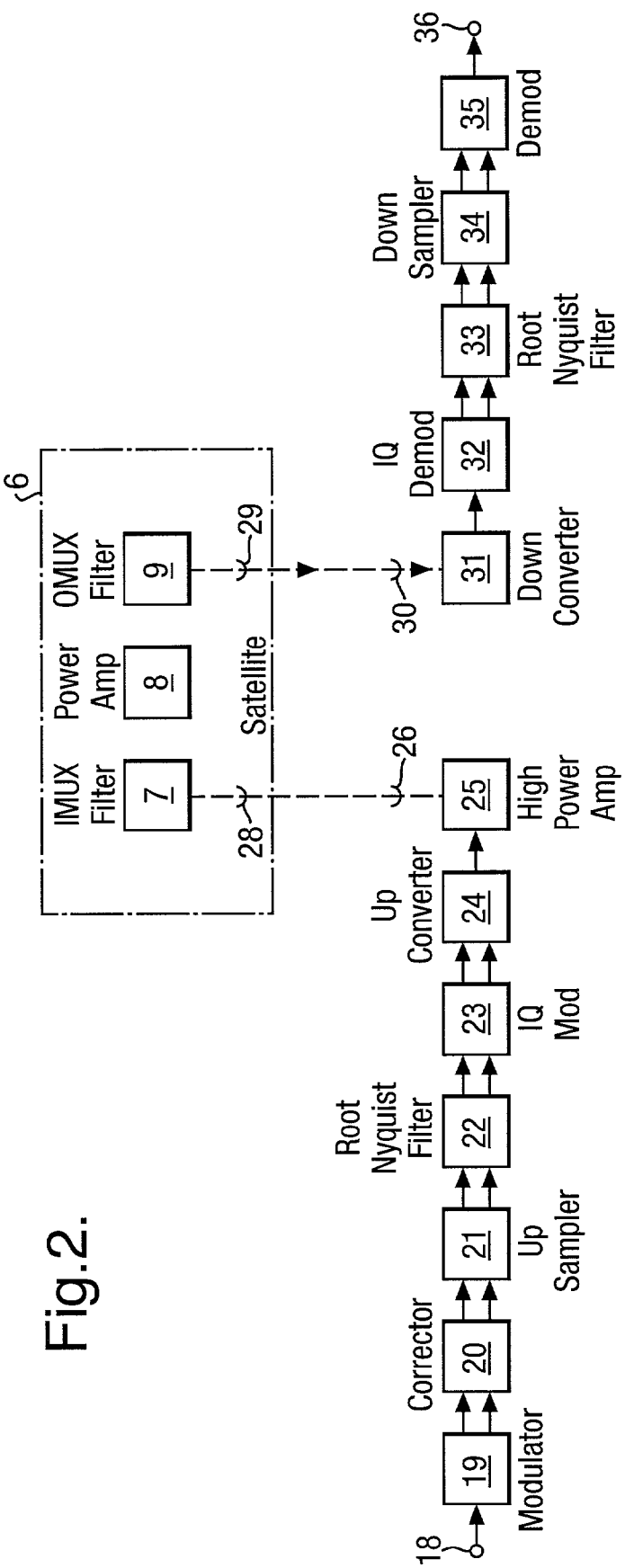

SATELLITE COMMUNICATION APPARATUS

BACKGROUND OF THE INVENTION

1. Field of the Invention

This invention relates to a satellite communication apparatus and particularly to a corrector for reducing distortion of a signal in a satellite communication channel.

2. Description of the Related Art

In a digital data transmission link, particularly a satellite transmission link, it is known for modulation techniques to use symbols arranged as points in a particular constellation pattern to represent digital data. The constellation shows all possible combinations of complex (I and Q) samples of the data being transmitted and the (constellation pattern is an overlay of all possible positions of each data sample at a particular point. Typical techniques are those of phase shift keying (PSK) and quadrature amplitude modulation (QAM). Common techniques are quadrature phase shift keying (QPS) which is used for digital satellite transmission for consumer TV applications, and 8 PSK which is used, for example, for satellite news gathering applications. It is a desire to utilise higher order modulation methods such as 16 PSK and 16 QAM to permit transmission at a higher bit rate so as to facilitate a greater number of channels to be carried within a predefined bandwidth of a particular transmission link.

As is well known, transmission of a modulated signal through a transmission link such as a terrestrial link, cable or satellite results in distortion of the signal. The distortion is due, at least in part, to non-linear effects upon a signal as it passes through the transmission link. The distortion, in terms of magnitude and/or phase, results in a change in location of the constellation points for any given modulation scheme and an increase in the order of modulation results in a decrease in the distance between constellation points, thereby leading to distortion having a greater effect. Such distortion has the disadvantage of producing errors in demodulation.

It is known to compensate for such non-linear distortion effects within transmission links by use of a pre-correction compensator. Signal pre-distortion performed at radio frequencies (RF), intermediate frequencies (IF) or base band frequencies is often carried out by application of an inverse function of the distortion to be expected of the signal in the transmission path. Such pre-distortion is disclosed in WO-A-95132561 and U.S. Pat. No. 4,992,754. Such forms of pre-correction tend to generate out-of-band components which are passed through to amplifiers in the transmission channel. Where the amplifier has an input filter, as is common for amplifiers used in satellite transmission links, then these out-of-band components are usually filtered out prior to amplification. Thus, the input signal to the amplifier is not the entire signal. This means that pre-correction is not effective for correction of amplifiers contained within satellite transponders where the bandwidth of the incoming signal is high in relation to the bandwidth of the transponder. Further, for higher order modulation schemes, such a form of pre-correction requires very high clocking rates in order to generate the wide-band pre-distortion components.

The foregoing problems are partially mitigated by the apparatus disclosed in WO-A-0025495, which discloses an arrangement for pre-distorting a signal so as to offset later distortion of the signal during transmission across a satellite transmission link which contains root Nyquist bandpass filters in respective up and down links. The apparatus includes a plurality of identical pre-distorting stages each of which generates an approximation of the required pre-distortion. Each successive stage receives an approximation from the preceding stage so that errors in successive approximations converge towards zero with increase in the number of stages. However, each pre-distorting stage contains only a forward model of the up and down root Nyquist filters and a forward model of the amplifier used in the satellite. Thus, the disclosure of WO-A-0025495 does not provide corrections for distortions in other parts of the transmission link and corrects only non-linear phase and non-linear magnitude distortions. In this respect, other forms of distortions are caused by group (delay and also by truncating the frequency spectrum of the transmitted signal by the filters used in the channel.

Referring to FIG. 1, which shows in block schematic form a transmitting end of a satellite link, there is shown a satellite modulator 1 providing output to a group delay equaliser 2 which applies equal and opposite delay so as to provide equalisation of the delay created by the satellite input multiplex filter (IMUX) 7 and output multiplex filter (OMUX) 9. The group delay equaliser is based upon linear distortion. Output from the group delay equaliser is applied to an up converter 3 and thence to a high power amplifier 4. The high power amplifier 4 provides a signal to a satellite dish 5 which transmits the data to a satellite 6. The satellite 6 incorporates the input multiplexer filter 7 feeding a power amplifier 8 which may be a travelling wave tube (TWT) or a solid state power amplifier and output from the amplifier 8 is applied to the output multiplex filter 9 for transmission to a receiving satellite dish (not shown).

The principal group delay in the up link is caused by the IMUX filter 7 and OMUX filter 9. The group delay equaliser 2, which may be implemented in digital or analogue form, and may be part of the modulator hardware, is designed to implement a group delay function which is equal and opposite to the sum total of the group delay contributions of the IMUX and OMUX filters.

If the amplifier 4 and satellite power amplifier 8 are operated with a large power back off, i.e. operated in the linear region of the amplifiers, so that the channel is essentially linear, then the equaliser is able to substantially correct for the group delay contributions of the channel.

However, in order to improve power efficiency of the channel, it is usual to operate the high power amplifier 4 and power amplifier 8 with only a small power back off, i.e. in a non-linear region of the amplifiers. An output power back off of 3 dB from full saturated power for the high power amplifier and 0.5 dB from full saturated power for the satellite power amplifier 8 may be typically employed. Such non-linear effects are pre-corrected by the apparatus disclosed in WO-A-0025495.

However, when a low value of back off is used, both the high power amplifier 4 and the satellite power amplifier 8, operating in their non-linear regions, have an effect upon group delay with the result that the group delay equaliser 2 is not able to completely correct for the channel group delay, although partial correction may take place depending on the high power amplifier and the power amplifier non-linearities.

It is an object of this invention to provide a corrector for group delay which will achieve a more efficient correction than the prior art where power back off is small.

An additional difficulty associated with the prior art is of distortions caused by truncating the frequency spectrum, e.g. by filtering, in the satellite transponder. If the spectrum of a transmitted signal is truncated, for example by the influence of a narrow band filter in the channel, then signal distortion occurs which degrades the bit error rate (BER) of a digital signal. Thus, if the channel is operated at a high bit rate, the IMUX and OMUX filters 7, 9 will cause spectrum truncation.

It is, accordingly, a further object of this invention to at least partially correct for such spectrum truncation.

SUMMARY OF THE INVENTION

According to a first aspect of this invention there is provided a satellite communication apparatus including corrector means for reducing distortion of a signal in a satellite communication channel, said corrector means comprising a forward model providing pre-correction required for counteracting distortion of said signal in said channel, said forward model being a pre-calculated estimate of non-linearity and group delay in said channel.

Preferably, said channel includes a satellite having a cascaded input multiplexer filter, a power amplifier and an output multiplexer filter, and said forward model further comprises a model of magnitude response of said input multiplexer filter and output multiplexer filter, whereby magnitude response of said channel may be corrected.

Advantageously, successive cascaded identical stages of said corrector means are provided whereby distortion in said channel is successively reduced towards zero by each successive stage.

In a preferred embodiment, said forward model comprises a series connection of an up-sampler, a model representative of magnitude and phase of:

a transmission side root Nyquist filter,
a transmission side high power amplifier,
a satellite input multiplexer filter,
a satellite power amplifier,
a satellite output multiplexer filter,
a receiver side root Nyquist filter, and a down sampler.

Conveniently, said satellite power amplifier is one of a travelling wave tube and a solid state power amplifier.

Preferably, an initial approximator is connected in an input path to said corrector means, said initial approximator comprising a static pre-distortion approximation model representative of channel magnitude and phase non-linearity and/or group delay of said channel.

Conveniently, said initial approximator is substantially an inverse function of the forward model of said corrector means.

Advantageously, said signal is modulated in accordance with one of 16 QAM, 32 QAM, 8 PSK and 16 PSK.

Conveniently, one initial approximator and three successive corrector means stages are provided or, alternatively, six successive corrector means are provided.

According to a further aspect of this invention there is provided a method for reducing distortion of a signal in a satellite communication channel including the step of modelling distortion of said signal in said channel caused by non-linearity and group delay and providing said model as a forward model in a corrector for counteracting said distortion.

Preferably, said channel includes a satellite having a cascaded input multiplexer filter, a power amplifier and an output multiplexer filter and said forward model further comprises a model of magnitude response of said input multiplexer filter and output multiplexer filter, whereby magnitude response of said channel may be corrected.

Advantageously, successive cascaded identical stages of said corrector are provided whereby distortion in said channel is successively reduced towards zero by each successive stage.

In a preferred embodiment, said forward model comprises a series connection of an up-sampler; a representation of magnitude and phase distortion produced by a transmitting side root Nyquist filter, a transmitting side high power amplifier, a satellite input multiplexer filter, a satellite power amplifier, a satellite output multiplexer filter, a receiving side root Nyquist filter; and a down sampler.

Preferably, a static pre-distorter approximation model representative of channel magnitude and phase non-linearity and/or group delay of said channel is evaluated and said signal passed through said initial approximator prior to passage to said forward model.

Preferably, said approximation model is substantially an initial approximation arranged to be an inverse function of the forward model.

BRIEF DESCRIPTION OF THE DRAWINGS

The invention will now be described, by way of example, with reference to the accompanying drawings, in which:

FIG. 2 shows, in block schematic form, a satellite transmission apparatus in accordance with this invention.

In the Figures like reference numerals denote like parts.

Figure 1:
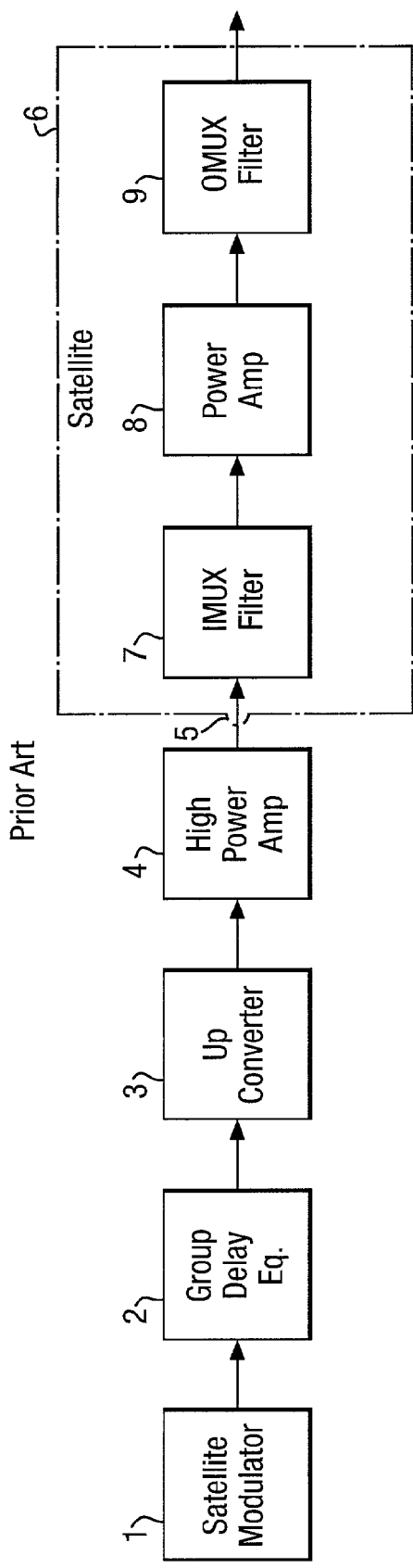
FIG. 1 shows, in block schematic form, a transmitting end of a satellite link.

A channel link which, by way of example is shown as a satellite channel link, will now be described with reference to FIG. 2. The transmitter side has a modulator 19 has an input 18 for receiving a stream of data bits and the modulator produces complex, I and Q, modulated outputs which are input to a corrector 20 for reducing signal channel distortion. The corrector will be described in detail hereinafter. Output from the corrector is applied to an up sampler 21 which multiplies the input bit rate by a factor of 2 or more so as to provide a required output facilitating operation of a root Nyquist filter 22, which is usually a bandpass filter. It is usual to use Nyquist filtering within a transmission link in order to constrain the bandwidth of the transmitted signal. Output from the filter 22 is applied to an I, Q modulator 23 which provides an output to an up-converter 24, output of which is amplified by a high powered amplifier 25 and then transmitted by, for example, a parabolic dish 26 to the satellite 6.

The satellite 6 has a receiving antenna 28 applying input to the IMUX filter 7, thence to the power amplifier 8 and the OMUX filter 9 (as described above). Output from the OMUX filter is applied to a transmitting antenna 29 and a signal is received by, for example, a parabolic dish 30 at the receiver side.

An output R.F. signal from the dish 30 is applied to a down converter 31. Output from the down converter 31 is applied to an I, Q demodulator 32 which, in turn, provides output to a root Nyquist band pass filter 33. The output of the filter 33 is applied to down-sampler 34 and the I, Q down sampled outputs are demodulated by demodulator 35 to provide digital data transmitted by the symbols within the modulation scheme and provided at output terminal 36.

The corrector 20 is arranged in accordance with this invention to apply pre-distortion to the incoming signal to compensate for the distortion subsequently applied to that signal during its passage through the transmission/reception channel and the corrector is also arranged to substantially correct for group delay distortions and distortions caused by truncating the frequency spectrum due to filtering. The corrector 20 is shown in greater detail with reference to FIGS. 3 and 4.

Figure 3A:
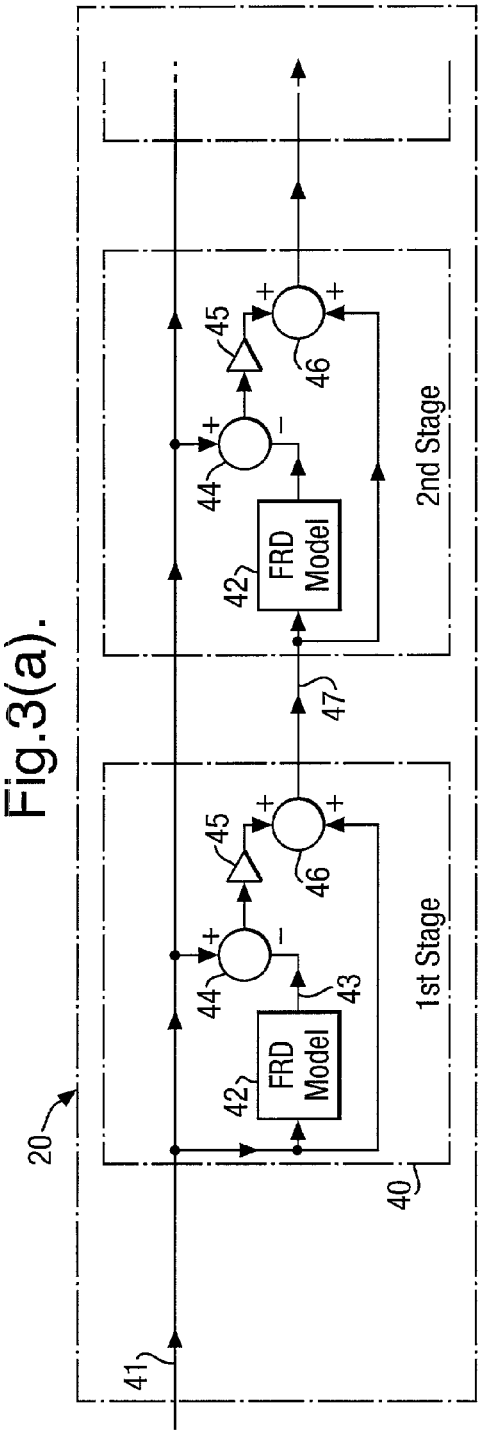
FIG. 3(a) shows, in block schematic form, one embodiment of a corrector for reducing signal channel distortion used in this invention.

Referring to FIG. 3(a), an input signal Vi on line 41, although shown as a single signal input line, is a complex signal representative of both linear and non-linear magnitude and phase and, similarly, output from the apparatus shown in FIG. 3(a) is also a complex, I, Q signal. It will be understood by those skilled in the art that the inputs and outputs may be Cartesian or in polar form.

The input signal Vi is applied to a first stage 40 having a forward model 42 which is a pre-calculated forward model representative of the satellite transmission/reception channel from the input to the up sampler 21 to the output of the down sampler 34. It will be understood that the forward model is based upon the linear and non-linear transfer function f of the channel. Output 43 of the forward model is applied to one input of a subtractor 44, the other input of which is supplied from input line 41. The input to the subtractor 44 from line 41 is delayed by a delay (not shown) to provide delayed symbols representative of digital data for time=t(1) so as to align the data with the symbols at time=t(1) that are acted upon by the forward model 42. The subtractor 44 output, which is an error signal given by Vi−f(Vi), is applied to an amplifier 45 and thence to one input of an adder 46, the other input of adder 46 being derived from input line 41 which are delayed by a delay (not shown) representative of the delay through components 42, 44 and 45. The amplification A by amplifier 45 is chosen to achieve the highest convergence rate for a given forward model distorting function.

Output 47 of adder 46 provides an estimate of the required transmitted signal and concerns symbols representative of digital data for time=t(1), whereby a first stage of approximation of the input signal pre-corrected for channel distortion is provided which is given by A[Vi−f(Vi)]+Vi. Because the output 47 of the first, i.e. a single, stage is not mathematically the required corrected signal, i.e. A[Vi−f(Vi)]+Vi≠Vi, so further stages are provided which are identical to the first stage 40 so as to provide cascaded, successive stages of pre-distortion, each approximating to the required output signal necessary for correction of the signal at the output 36. It has been found by computer simulation that errors in successive approximations converge toward zero with increase in the number of stages. In the example shown, there are second and further successive, cascaded, stages. It has been found that six stages of successive approximation provides a reasonable balance between convergence towards zero and hardware implementation of the corrector. By using a number of successive stages of approximation, the error converges to zero and the final output becomes the required transmitted signal.

During passage of symbols representative of digital data for time=t(1) through the second stage, the first stage will be supplied with symbols representative of digital data for time=t(1+n), where n represents the pipeline delay.

Figure 3B:
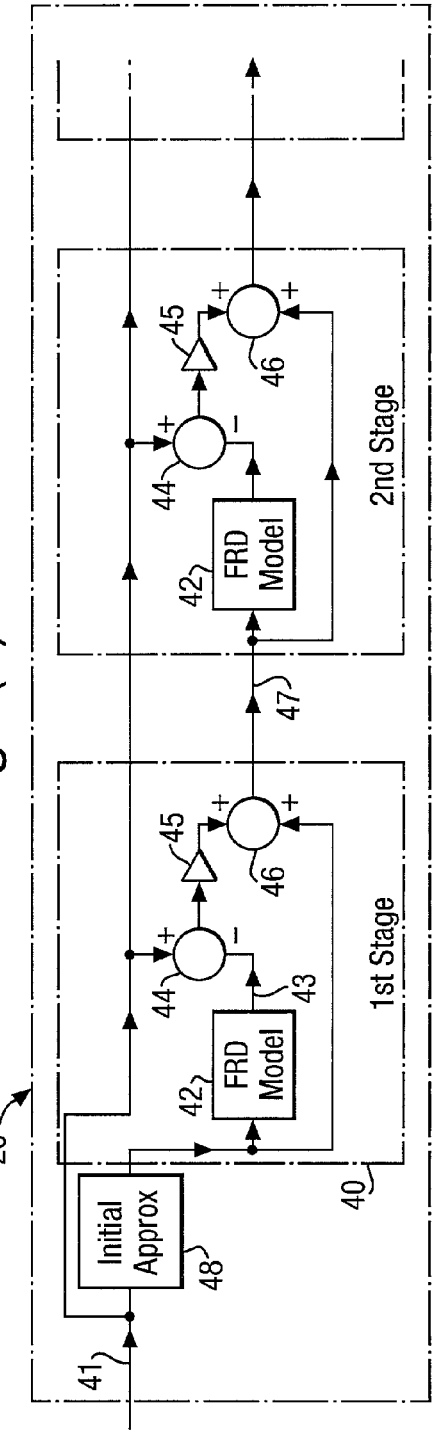
FIG. 3(b) shows, in block schematic form, another embodiment of a corrector for reducing signal channel distortion used in this invention.

The corrector 20 may include an initial approximation approximator 48 in input line 41, as shown in FIG. 3(b), which is arranged to provide an output which is approximately the inverse of the distorting function of forward model 42. For pre-distortion of an amplifier such as a TWT, the initial approximator 48 may be a function which bases the constellation points in the correct place for pre-distortion but which does not dynamically change their position from symbol to symbol. Such an initial approximator is known in the art as a static pre-distorter. Such a static pre-distorter may comprise equal and opposite pre-distorters for distortion in the channel caused by non-linearity and group delay. The initial approximator disclosed in WO-A-0025495 produces an approximation of the non-linear distortion within the satellite. For combined non-linear and group delay correction, the approximator 48 may be a known non-linear corrector cascaded with a conventional group delay corrector.

Use of an initial approximator using a static pre-distortion approximator substantially reduces the number of d successive approximation stages required, e.g. typically one static correction stage plus three dynamic stages may be sufficient to provide the desired pre-distortion of a satellite transmission link such as that shown in FIG. 2. Without approximator 48, six successive stages 40 would typically be required.

Figure 4:
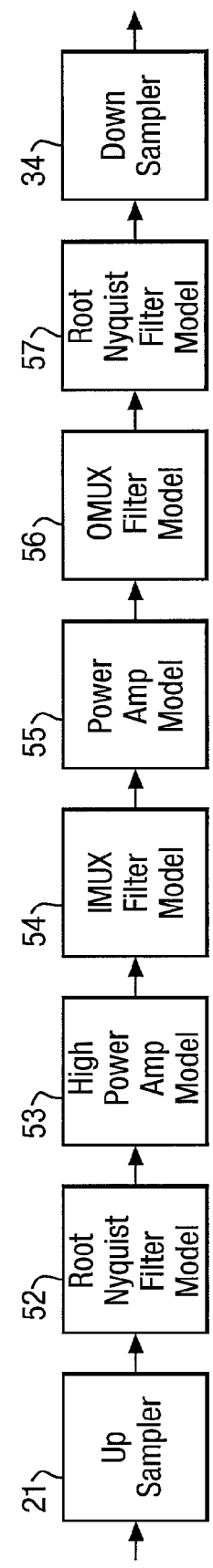
FIG. 4 shows, in block schematic form, a forward model of the elements for which pre-distortion is derived.

The components of the forward model 42 will now be described with reference to FIG. 4.

The forward model 42 is arranged to operate at a higher sampling rate than the input signal and so the input signal is up-sampled by the up-sampler 21 multiplying the input bit rate by two so as to provide required operation of the root Nyquist bandpass filter 22 having model 52 representative of a model of magnitude and phase, i.e. output magnitude versus frequency and phases versus frequency, of the filter 22. In other embodiments a multiplicand of more or less than 2 may be used. Filtered output is applied to a model of non-linearity expressed in magnitude and phase of the high power amplifier by model 53. Output from the model 53 is applied to an IMUX filter model 54 which models the magnitude and phase response of the IMUX filter 7. Output of the IMUX filter is applied to a model of non-linearity expressed in terms of magnitude and phase of the satellite power amplifier using model 55. Output of the model 55 is applied to an OMUX model 57 which is a model of the magnitude and phase response of the OMUX filter 59. The output of the OMUX model is applied to a further root Nyquist bandpass filter model 57 representative of filter 33 magnitude and phase. Output of the model 57 is down-sampled by down-sampler 34 and then output.

The models 54 and 56 may represent only the group delay of the filters 7 and 9, in which event non-linear correction and group delay correction is implemented by the invention.

Alternatively, the models 54 and 56 may also represent the magnitude responses of the filters 7 and 9, in which event the invention implements non-linear correction, group delay correction and magnitude response correction. The magnitude response correction will also correct for the spectrum truncation caused by the filters 7 and 9.

The corrector 20 of this invention may, in principle, correct for any channel impairment provided that it is predeterminable. Correction is achieved by successive approximation converging the error to zero.

The present inventor has shown that by simulation under conditions of a non-linear channel, group delay equalisation achieved by the present invention results in better (equalisation than group delay equalisation achieved by the known prior art. The reason for the improvement made by the present invention is that the present invention takes into account the combined effects of group delay distortion and non-linear distortion, whereas known group delay (equalisation is effective only where there is no non-linear distortion.

It is to be understood that modifications could be made and that all such modifications falling within the spirit and scope of the appended claims are intended to be included in the present invention.

We claim:

1. A satellite communication apparatus including successive cascaded identical stages of corrector means for reducing distortion of a signal in a satellite communication channel, each stage of said corrector means providing pre-correction required for counteracting distortion of said signal in said channel and including a forward model, wherein said forward model is a pre-calculated estimate of non-linearity and group delay in said channel, and further wherein distortion in said channel is successively reduced towards zero by each successive stage.

2. An apparatus as claimed in claim 1, wherein said channel includes a satellite having a cascaded input multiplexer filter, a power amplifier an output multiplexer filter, and said forward model further comprises a model of magnitude response of said input multiplexer filter and output multiplexer filter, whereby magnitude response of said channel may be corrected.

3. An apparatus as claimed in claim 1, wherein said forward model comprises a series connection of an up-sampler, a model representative of magnitude and phase of:
   a transmission side root Nyquist filter,
   a transmission side high power amplifier,
   a satellite input multiplexer filter,
   a satellite power amplifier,
   a satellite output multiplexer filter,
   a receiver side root Nyquist filter,
and a down sampler.

4. An apparatus as claimed in claim 3, wherein said satellite power amplifier is one of a travelling wave tube and a solid state amplifier.

5. An apparatus as claimed in claim 1, wherein an initial approximator is connected in an input path to said corrector means, said initial approximator comprising a static pre-distortion approximation model representative of at least one of channel magnitude and phase non-linearity and group delay of said channel.

6. An apparatus as claimed in claim 5, wherein said initial approximator is substantially an inverse function of the forward model of said corrector means.

7. An apparatus as claimed in claim 1, wherein said signal is modulated in accordance with one of 16 QAM, 32 QAM, 8 PSK and 16 PSK.

8. An apparatus as claimed in claim 5, wherein one initial approximator and three successive corrector means stages are provided.

9. An apparatus as claimed in claim 1, wherein six successive corrector means are provided.

10. A method for reducing distortion of a signal in a satellite communication channel including the step of providing successive cascaded identical stages of a corrector providing pre-correction to counteract distortion of said signal in said channel, said pre-corrector being formed as a forward model modelling non-linearity and group delay in said channel, wherein distortion in said channel is successively reduced towards zero by each successive stage.

11. A method as claimed in claim 10, wherein said channel includes a satellite having a cascaded input multiplexer filter, a power amplifier and an output multiplexer filter and said forward model further model further comprises a model of magnitude response of said input multiplexer filter and output multiplexer filter, whereby magnitude response of said channel may be corrected.

12. A method as claimed in claim 10, wherein said forward model comprises a series connection of an up-sampler; a representation of magnitude and phase distortion produced by a transmitting side root Nyquist filter, a transmitting side high power amplifier, a satellite input multiplexer filter, a satellite power amplifier, a satellite output multiplexer filter, a receiving side root Nyquist filter; and a down sampler.

13. A method as claimed in claim 10, wherein a static pre-distorter approximation model representative of at least one of channel magnitude and phase non-linearity and group delay of said channel is evaluated and said signal passed through said initial approximator prior to passage to said forward model.

14. A method as claimed in claim 13, wherein said approximation model is substantially an initial approximation arranged to be an inverse function of the forward model.

15. A satellite communication apparatus including corrector means for reducing distortion of a signal in a satellite communication channel, said corrector means comprising a forward model providing pre-correction required for counteracting distortion of said signal in said channel, said forward model being a pre-calculated estimate of non-linearity and group delay in said channel comprising a series connection of an up-sampler, and a model representative of magnitude and phase of:
   a transmission side root Nyquist filter,
   a transmission side high power amplifier,
   a satellite input multiplexer filter,
   a satellite power amplifier,
   a satellite output multiplexer filter,
   a receiver side root Nyquist filter,
and a down sampler.

16. A satellite communication apparatus including corrector means for reducing distortion of a signal in a satellite communication channel, said corrector means comprising a forward model providing pre-correction required for counteracting distortion of said signal in said channel, said forward model being a pre-calculated estimate of non-linearity and group delay in said channel comprising a series connection of an up-sampler, a model representative of magnitude and phase of:
   a transmission side root Nyquist filter,
   a transmission side high power amplifier,
   a satellite input multiplexer filter,
   a satellite power amplifier,
   a satellite output multiplexer filter,
   a receiver side root Nyquist filter,
and a down sampler,
and wherein an initial approximator is connected in an input path to said corrector means, said initial approximator comprising a static pre-distortion approximation model representative of at least one of channel magnitude and phase non-linearity and group delay of said channel.

17. A method for reducing distortion of a signal in a satellite communication channel including the step of modelling distortion of said signal in said channel caused by non-linearity and group delay and providing said model as a forward model in a corrector for counteracting said distortion, and wherein said forward model comprises a series connection of an up-sampler; a representation of magnitude and phase distortion produced by a transmitting side root Nyquist filter, a transmitting side high power amplifier, a satellite input multiplexer filter, a satellite power amplifier, a satellite output multiplexer filter, a receiving side root Nyquist filter; and a down sampler.

18. A method for reducing distortion of a signal in a satellite communication channel including the step of modelling distortion of said signal in said channel caused by non-linearity and group delay and providing said model as a forward model in a corrector for counteracting said distortion, and wherein said forward model comprises a series connection of an up-sampler; a representation of magnitude and phase distortion produced by a transmitting side root Nyquist filter, a transmitting side high power amplifier, a satellite input multiplexer filter, a satellite power amplifier, a satellite output multiplexer filter, a receiving side root Nyquist filter; and a down sampler, and further wherein a static pre-distorter approximation model representative of at least one of channel magnitude and phase non-linearity and group delay of said channel is evaluated and said signal passed through said initial approximator prior to passage to said forward model.

19. A satellite communication apparatus including corrector means for reducing distortion of a signal in a satellite communication channel, said corrector means comprising a forward model providing pre-correction required for counteracting distortion of said signal in said channel, said forward model being a estimate of non-linearity and group delay in said channel, wherein said forward model includes a satellite power amplifier which is one of a travelling wave tube and a solid state amplifier.

20. A satellite communication apparatus including corrector means for reducing distortion of a signal in a satellite communication channel, said corrector means comprising a forward model providing pre-correction required for counteracting distortion of said signal in said channel, said forward model being a pre-calculated estimate of non-linearity and group delay in said channel, wherein an initial approximator is connected in an input path to said corrector means, said initial approximator comprising a static pre-distortion approximation model representative of at least one of channel magnitude and phase non-linearity and group delay of said channel.

21. A satellite communication apparatus including corrector means for reducing distortion of a signal in a satellite communication channel, said corrector means comprising a forward model providing pre-correction required for counteracting distortion of said signal in said channel, said forward model being a pre-calculated estimate of non-linearity and group delay in said channel, wherein an initial approximator is connected in an input path to said corrector means, said initial approximator comprising a static pre-distortion approximation model representative of at least one of channel magnitude and phase non-linearity and group delay of said channel, and further wherein said initial approximator is substantially an inverse function of the forward model of said corrector means.

22. A method for reducing distortion of a signal in a satellite communication channel including the steps of modelling distortion of said signal in said channel caused by non-linearity and group delay and providing said model as a forward model in a corrector for counteracting said distortion, wherein a static pre-distorter approximation model representative of at least one of channel magnitude and phase non-linearity and group delay of said channel is evaluated and said signal passed through said initial approximator prior to passage to said forward model.

23. A method for reducing distortion of a signal in a satellite communication channel including the steps of modelling distortion of said signal in said channel caused by non-linearity and group delay and providing said model as a forward model in a corrector for counteracting said distortion, wherein a static pre-distorter approximation model representative of at least one of channel magnitude and phase non-linearity and group delay of said channel is evaluated and said signal passed through said initial approximator prior to passage to said forward model, and further wherein said approximation model is substantially an initial approximation arranged to be an inverse function of the forward model.

\* \* \* \* \*